United States Patent
Wunderlich et al.

(10) Patent No.: US 9,837,172 B2
(45) Date of Patent: Dec. 5, 2017

(54) ILLUMINATED POINTER INSTRUMENT FOR A MOTOR VEHICLE

(71) Applicant: AUDI AG, Ingolstadt (DE)

(72) Inventors: Matthias Wunderlich, Ingolstadt (DE); Lutz Diederichs, Koesching (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/325,340

(22) PCT Filed: Jul. 7, 2015

(86) PCT No.: PCT/EP2015/001391
§ 371 (c)(1),
(2) Date: Jan. 10, 2017

(87) PCT Pub. No.: WO2016/005051
PCT Pub. Date: Jan. 14, 2016

(65) Prior Publication Data
US 2017/0178754 A1    Jun. 22, 2017

(30) Foreign Application Priority Data

Jul. 11, 2014    (DE) .................. 10 2014 010 310

(51) Int. Cl.
*G01D 13/22*    (2006.01)
*G01D 11/28*    (2006.01)
(Continued)

(52) U.S. Cl.
CPC .............. *G12B 11/04* (2013.01); *B60K 35/00* (2013.01); *G01D 11/28* (2013.01); *G01D 13/22* (2013.01); *G02B 6/00* (2013.01)

(58) Field of Classification Search
CPC ........ G01D 11/28; G01D 13/22; G01D 13/26; G01D 13/265; G12B 11/04
(Continued)

(56) References Cited

U.S. PATENT DOCUMENTS

| 4,163,428 A | 8/1979 | Ishikawa |
| 5,142,453 A | 8/1992 | Ohta et al. |

(Continued)

FOREIGN PATENT DOCUMENTS

| CN | 101408673 | 4/2009 |
| CN | 203118498 | 8/2013 |

(Continued)

OTHER PUBLICATIONS

German Office Action dated Jun. 17, 2015, from German Application No. 10 2014 010 310.2, 8 pages.
(Continued)

*Primary Examiner* — R. A. Smith
(74) *Attorney, Agent, or Firm* — Staas & Halsey LLP (57) ABSTRACT

A pointer needle for an indication device of a motor vehicle has a transparent optical waveguide that receives light propagating along a direction of propagation at a light-entry side, and emits the light in an emission direction at a light-exit side. The optical waveguide has a scattering side opposite to the light-exit side, the scattering side having steps arranged offset to one another across the propagation direction. When the steps are irradiated by light, the pointer needle provided in the indication device can clearly be perceived in the dark.

15 Claims, 6 Drawing Sheets

(51) Int. Cl.
*G12B 11/04* (2006.01)
*B60K 35/00* (2006.01)
*G02B 6/00* (2006.01)

(58) Field of Classification Search
USPC ........ 116/62.1, 62.4, 286, 287, 288, DIG. 5, 116/DIG. 6, DIG. 36; 362/23.21
See application file for complete search history.

(56) References Cited

U.S. PATENT DOCUMENTS

| | | |
|---|---|---|
| 5,161,872 A | 11/1992 | Sasaki et al. |
| 5,211,128 A | 5/1993 | Katoh et al. |
| 5,607,227 A | 3/1997 | Yasumoto et al. |
| 6,305,813 B1 | 10/2001 | Lekson et al. |
| 7,493,010 B1 | 2/2009 | Lien et al. |
| 2003/0123262 A1 | 7/2003 | Suehiro et al. |

FOREIGN PATENT DOCUMENTS

| | | | |
|---|---|---|---|
| DE | 28 23 639 | | 12/1978 |
| DE | 33 47 014 A1 | | 7/1985 |
| DE | 36 28 540 A1 | | 3/1988 |
| DE | 94 20 813 U1 | | 4/1995 |
| DE | 195 37 346 A1 | | 4/1996 |
| DE | 41 21 248 B4 | | 4/2007 |
| DE | 10 2008 011 062 A1 | | 9/2008 |
| DE | 10 2014 010 310.2 | | 7/2014 |
| EP | 1 775 623 A1 | | 4/2007 |
| JP | 6-281751 | | 10/1994 |
| JP | 2008-116391 | | 5/2008 |
| JP | 2008116391 A | * | 5/2008 ............ G01D 13/22 |
| JP | 2012-154798 | | 8/2012 |
| JP | 2012230054 A | * | 11/2012 ............ G01D 13/22 |
| WO | 99/13298 | | 3/1999 |
| WO | PCT/EP2015/001391 | | 7/2015 |

OTHER PUBLICATIONS

German Office Action dated Aug. 11, 2015, from German Application No. 10 2014 010 310.2, 5 pages.
German Office Action dated Nov. 30, 2015, from German Application No. 10 2014 010 310.2, 1 page.
German Office Action dated Oct. 12, 2016, from German Application No. 10 2014 010 310.2, 1 page.
International Search Report dated Oct. 6, 2015, from International Patent Application No. PCT/EP2015/001391, 6 pages.
English translation of the International Preliminary Report on Patentability dated Jan. 17, 2017 from International Patent Application No. PCT/EP2015/001391, 10 pages.
Chinese Office Action dated Aug. 14, 2017 from Chinese Patent Application No. 201580037922.2, 5 pages.

* cited by examiner

ILLUMINATED POINTER INSTRUMENT FOR A MOTOR VEHICLE

CROSS REFERENCE TO RELATED APPLICATIONS

This application is a U.S. national stage of International Application No. PCT/EP2015/001391, filed on Jul. 7, 2015. The International Application claims the priority benefit of German Application No. 10 2014 010 310.2 filed on Jul. 11, 2014. Both the International Application and German Application are incorporated by reference herein in their entirety.

BACKGROUND

Described herein is a display device for a motor vehicle. The display device is configured as a pointer instrument and has a pointer with a pointer needle in which a transparent lightguide emits light in a propagation direction toward a viewer.

Such pointer needles are typically used in display instruments in which a specific value is to be marked within a circular scale. In particular in the case of combination instruments, this involves, for example, a speed display (tachometer) or rotational speed display. In order to obtain a pointer needle of transparent lightguide, the pointer needle can be fabricated, for example, from PMMA or a polycarbonate (PC) and can have on an underside a hot stamping foil, by which light which is propagated in the lightguide is scattered in the emission direction.

Since the lightguide is transparent, in the dark, for example when traveling at night, generally only the scattering hot stamping foil is seen, which foil is perceived only as a diffuse bar, i.e. as a result of its scattering property. Therefore, a driver can undesirably take a long time to focus on the pointer needle when moving his gaze from the events on the road to the combination instrument.

German Patent Application No. 10 2008 011 062 A1 describes a multi-colored pointer for a measuring element which can generate at least two colors of light from a light source with a single color. The light is colored by using a film.

German Patent Application No. 36 28 540 A1 describes a pointer for a display instrument whose cross section is in the shape of an equilateral triangle, with the result that a colored layer can be seen on the underside from various directions of viewing the pointer, as a result of refraction and total reflection of the beam entry in the pointer.

Japan Patent Application No. 6-281751 A describes a pointer for a display instrument, into the transparent material of which a fluorescent substance is mixed. A curved groove scatters the fluorescent light into the surroundings.

SUMMARY

Described herein is a pointer needle for a display device of a motor vehicle such that the pointer needle can be perceived clearly in the dark.

The pointer needle and a motor vehicle having a display device with the pointer needle is described herein. Advantageous developments are further described herein.

A display device for a motor vehicle includes a pointer needle with a transparent lightguide which is configured to receive, on a light entry side, light which propagates along a propagation direction from a light input device, and to emit the light in a predetermined emission direction on a light-exit side, that is to say toward a viewer. In other words, the pointer needle has a lightguide which is, in particular shaped in an elongate fashion and extends in the direction of longitudinal extent thereof along the pointer needle from a pointer foot to a pointer tip. Light is input into the lightguide at a light-entry side by the light input device, and the lightguide deflects the light toward the light emission direction, with the result that the light exits again on the light-exit side thereof.

For the deflection or scattering of the light there is provision that the lightguide described herein has a scattering side which lies opposite the light-exit side and has a plurality of steps. The steps are arranged offset in relation to one another, transversely or perpendicularly with respect to the propagation direction of the light, with the result that each step is irradiated independently of every other step, by the light which enters the lightguide on the light-entry side.

The display device described herein provides the advantage that now a diffusely lit bar cannot be seen as the pointer needle in the display device but instead an object which is lit in a three-dimensional fashion and is formed from illuminated steps which are arranged offset in relation to one another. A driver can therefore focus on the pointer needle with much less effort.

The steps may also be arranged one behind the other along the propagation direction, with the result that the steps together form a cascade or staircase as a result of their transverse offset with respect to the propagation direction and their arrangement one behind the other along the propagation direction. This results in a particularly pronounced depth effect when observing the pointer needle.

One advantageous development provides that the steps have a rough surface structure and/or scattering bodies which are integrated into a material of the lightguide and/or have a reflective, opaque surface coating and/or a fluorescent material. This results in the advantage that the steps appear particularly bright, since they divert a particularly large amount of light in the emission direction. A rough surface structure can be achieved for example by grinding the lightguide or by using a correspondingly rough tool mold when generating the lightguide, for example by injection molding or stamping the lightguide. For example a granulate made of reflective bodies, for example mother of pearl, can be provided as the scattering bodies. A reflective surface coating may be made available, for example, on the basis of chromium or a surface coating agent, e.g. with a white color. The fluorescent material can be integrated into the material of the lightguide or applied to the surface of the lightguide.

The steps may have an oblique position with respect to the propagation direction of the light, on the one hand, and the emission direction, on the other. In other words, a surface normal of the steps may enclose, with a vector of the propagation direction, an angle which lies in a range from 5° to 85°, or in a range from 5° to 45°. As a result, the steps appear as countersunk, wide, lit steps in the pointer needle.

With respect to the position of the light-entry side and the orientation of the steps there are two basic configurations in the display device described herein, for example, a lateral illumination, on the one hand, and a longitudinally directed illumination, on the other.

In the case of the lateral illumination there is provision that the light-entry side extends along a direction of longitudinal extent of the pointer needle from a pointer foot to a pointer tip. At the pointer foot, the pointer needle can be arranged on a rotatably mounted pointer shaft. The pointer tip can be moved by rotating the pointer shaft over a scale. The light input device therefore also extends from the pointer foot to the pointer tip on this longitudinal side of the pointer needle. The light input device has here a light-tight mount element into which a propagation region, e.g. with a lightguide fiber, is integrated. The propagation region is opened toward the light-entry side. The light is therefore distributed along the direction of longitudinal extent of the pointer needle in the propagation region and enters the lightguide laterally, that is to say perpendicularly with respect to the direction of longitudinal extent. The propagation direction along which the light enters the lightguide is therefore perpendicular with respect to the direction of longitudinal extent. Correspondingly, the steps extend along the direction of longitudinal extent from the pointer foot to the pointer tip. This provides the advantage that light can be distributed particularly homogenously in the lightguide and as a result the pointer needle is illuminated particularly homogenously.

In order to distribute the light in the propagation region within the mount element, one development provides that a lightguide fiber is arranged in the propagation region, and/or a wall of the mount element has a reflective or light-scattering coating and/or a fluorescent material. The reflective coating of the inside of the mount element can be achieved, for example, by using chromium or a mirrored foil. Light-scattering coatings can be achieved, for example, by using a surface coating, for example white paint, or by roughening the surface. The developments make it possible to transport the light from a light source into the lightguide of the pointer needle with particularly low loss.

Given lateral illumination, there is an example embodiment in which not only is the light input from a light-entry side but also the lightguide is configured to receive, on a further light-entry side lying opposite the light-entry side, light which propagates along a further propagation direction from a further light input device. In other words, light can therefore penetrate the lightguide from both of its longitudinal sides. On the scattering side, that is to say the underside of the lightguide facing the scale, further steps which are mirror-symmetrical with respect to the steps are made available, which also scatter the light which enters through the further light-entry side toward the propagation direction. The light can be transported or guided to the further light-entry side by a further mount element. In other words, in this embodiment the pointer needle is configured in such a way that a lightguide on each of its two longitudinal sides has a mount element for directing light into the longitudinal sides of the lightguide.

In the second illumination technique, of longitudinally directed illumination, there is provision that the light-entry side is formed on the pointer foot and the propagation direction of the entering light points along the longitudinal extent of the pointer from the pointer foot to the pointer tip. Correspondingly, the steps then extend perpendicularly with respect to the direction of longitudinal extent, that is to say transversely with respect to the pointer needle. This embodiment has the advantage that the pointer needle can be illuminated in its entire width since there is no need for a light-tight mount element to guide the light.

With respect to the generation of light, an embodiment of the display device provides that the pointer is arranged so as to be rotatable with respect to a light source for the light in that the light source is arranged next to the pointer shaft of the pointer, that is to say for example on a printed circuit board or circuit board which can also have a motor for rotating the pointer shaft. The light source is configured here to emit the light along the pointer shaft, e.g. into a pointer cap. The light input device can start in the pointer cap, the light input device then guiding the light toward the light-entry side of the lightguide. The light source can include, for example, one or more light emitting diodes. An alternative embodiment provides for the light source to be arranged in the pointer cap itself.

The display device described herein may be configured as a combination instrument. It can also have more than one of the described pointer needles. Each pointer needle is then associated, in particular, with one pointer instrument of the display device.

Also described herein is a motor vehicle (for example, a motor car, such as a passenger car). The motor vehicle may include at least one display device which constitutes in each case an embodiment of the display device described herein.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

Exemplary embodiments are explained below with reference to the drawings. In the exemplary embodiments the described components of the embodiments each constitute individual features which can be considered independently of one another and each also develop the disclosure independently of one another and can therefore be considered either individually or in a combination other than that shown. Furthermore, the described embodiments can also be supplemented by further features which have already been described.

Figure 1:
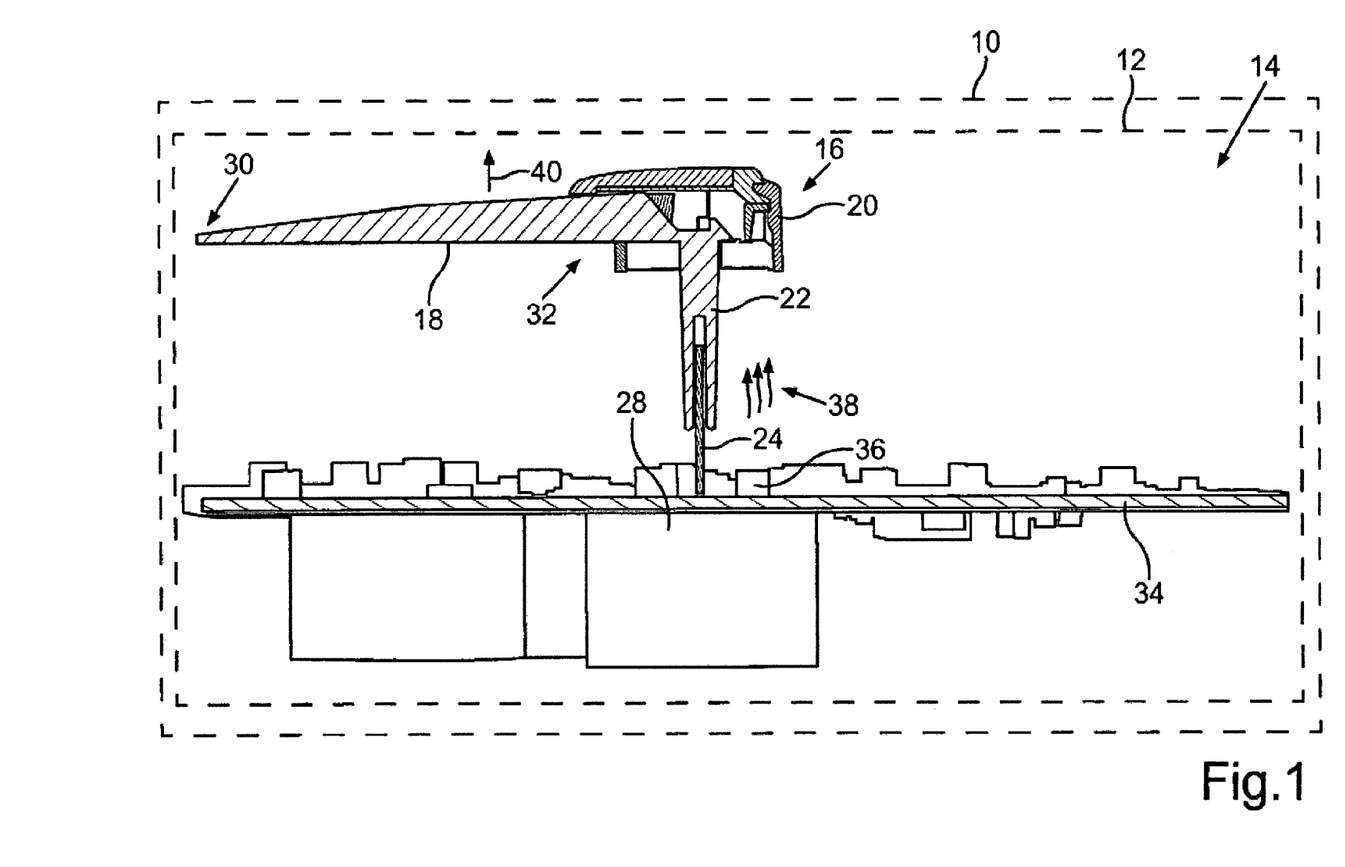
FIG. 1 is a schematic illustration of an embodiment of the motor vehicle as described herein.

FIG. 1 illustrates a motor vehicle 10 which can be, for example, a motor car, such as a passenger car. The motor vehicle 10 can have a display device 12 which can be configured, for example, as a combination instrument or as a display device of a dashboard of the motor vehicle 10. The display device 12 can have a pointer instrument 14. The pointer instrument 14 can be, for example, a tachometer or a rotational speed display. The pointer instrument 14 displays here a current value, to be displayed, on a scale (not illustrated) by using a pointer 16. The pointer 16 can have a pointer needle 18 and a pointer cap 20 and a pointer shaft 22. The pointer shaft 22 can be connected in a rotationally fixed fashion to a shaft 24 of an electric motor 28, for example plugged onto the shaft 24. By rotating the shaft 24 by using the motor 28, the pointer shaft 22 and also the entire pointer 16 can be rotated and as a result a pointer tip 30 of the pointer needle 18 can be oriented as a value of the scale. A pointer foot 32 of the pointer needle 18 can be arranged in the pointer cap 20. The motor 28 can be located on a printed circuit board 34. The pointer cap 20 can be embodied with a glossy injection-molded finish or surface coated and can be configured to cover a deflection of illumination for the pointer needle 18. The illumination can be effected by using various possibilities, and for example may be effected by an illumination using one or more light emitting diodes 36 which are arranged on an upper side of the printed circuit board 34, that is to say toward the pointer 16. The light emitting diodes 36 then emit their light 38 toward the pointer cap 20, where it is then input into the pointer needle 18 and as a result the pointer needle 18 is irradiated in an emission direction 40 away from the scale and toward a viewer by using deflection and/or reflection of the light 38.

The distribution of the light 38 in the pointer needle 18 can be effected by using lateral illumination as is explained in relation to FIGS. 2 through 5. An alternative constitutes a longitudinally directed illumination which will be explained in relation to FIG. 6.

Figure 2:
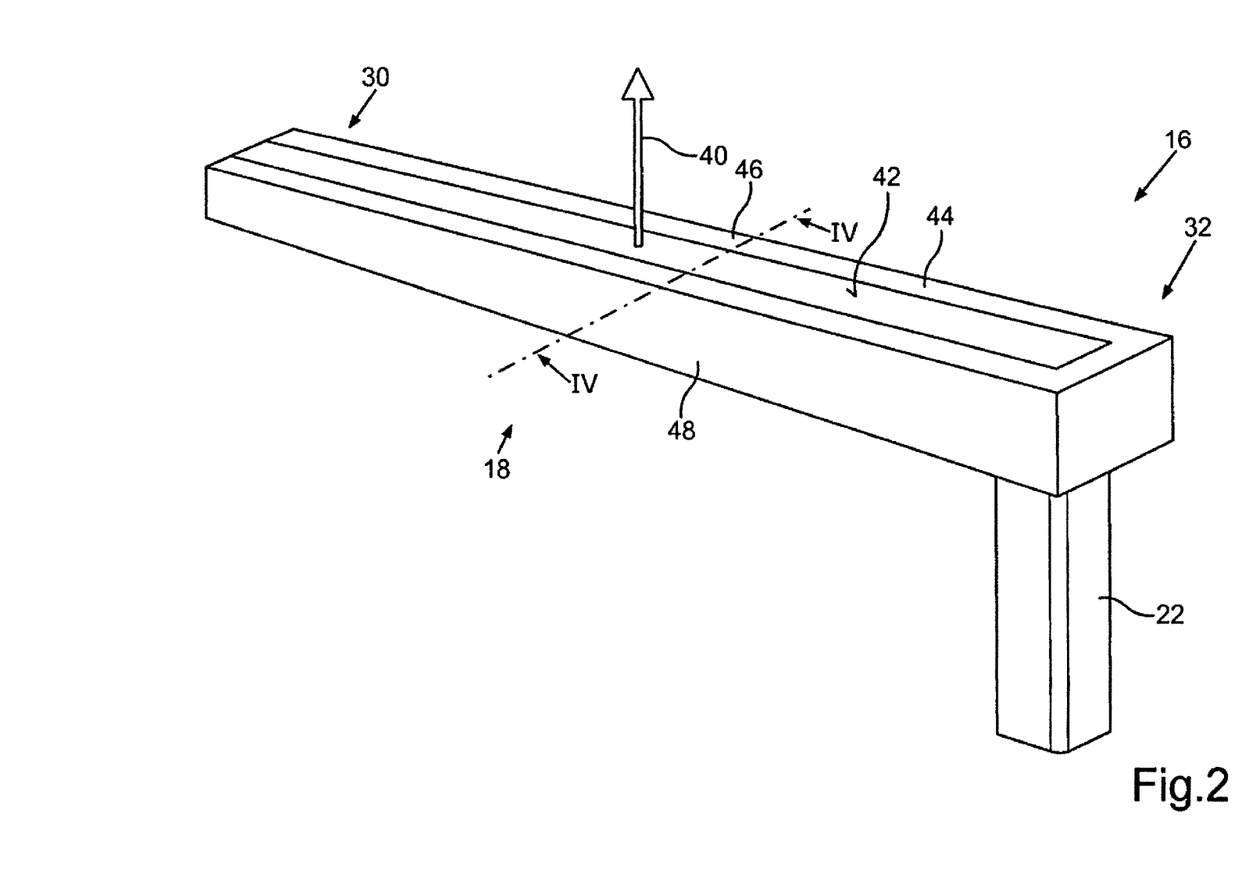
FIG. 2 is a schematic illustration of a perspective view of a pointer of a display device of the motor vehicle from FIG. 1.

The lateral illumination provides, as illustrated in FIG. 2, that the pointer needle 18 has a transparent lightguide 42 and a light-tight pointer sheath 44 which surrounds the lightguide 42 laterally, transversely with respect to the propagation direction 40. The lightguide 42 can be manufactured, for example, from PMMA or from a polycarbonate. The pointer sheath 44 can be provided with a first mount element 46 on one side and a second mount element 48 on the opposite side of the lightguide 42.

Figure 3:
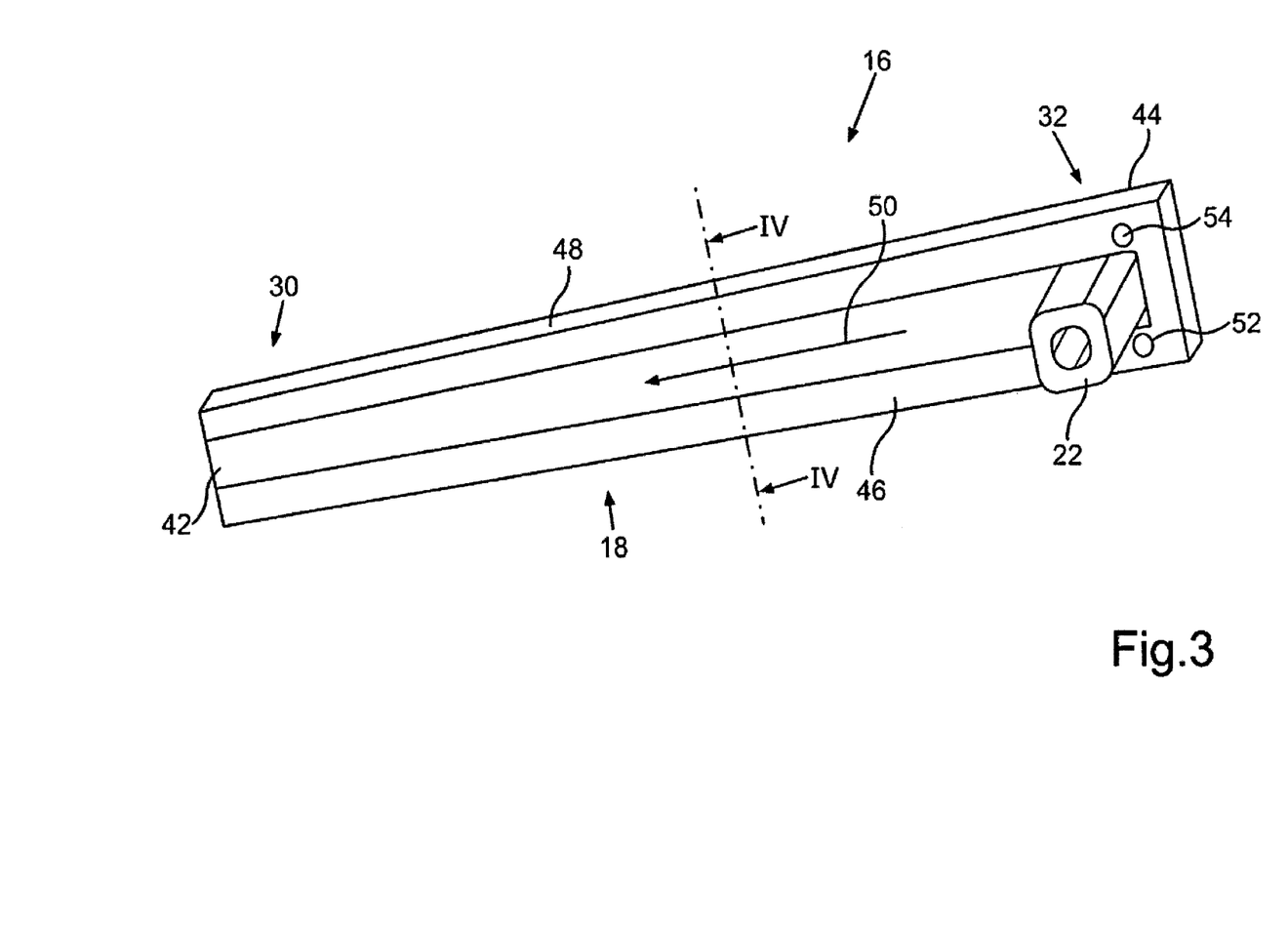
FIG. 3 is a schematic illustration of a further perspective view of the pointer from FIG. 2.

In FIG. 3, the pointer 16 is illustrated from a perspective from the circuit board 34, that is to say the light emitting diodes 36. The pointer foot 32 is defined toward the pointer tip 30. The mount elements 46, 48 also extend in the direction 50 of longitudinal extent from the pointer foot 32 to the pointer tip 30 and are arranged on opposite sides of the lightguide 42, that is to say enclose the lightguide 42 and therefore form a sandwich arrangement together with the lightguide 42. The light 38 which is emitted by the light emitting diodes 36 can penetrate a respective propagation region 52, 54 of the mount elements 46, 48 in the region of the pointer foot 32. The propagation regions 52, 54 extend along the direction 52 of longitudinal extent in the interior of the mount elements 46, 48 as illustrated by using the cross section in FIG. 4. A possible position along the cross section along the pointer needle 18 is illustrated in FIG. 3 and FIG. 4.

Figure 4:
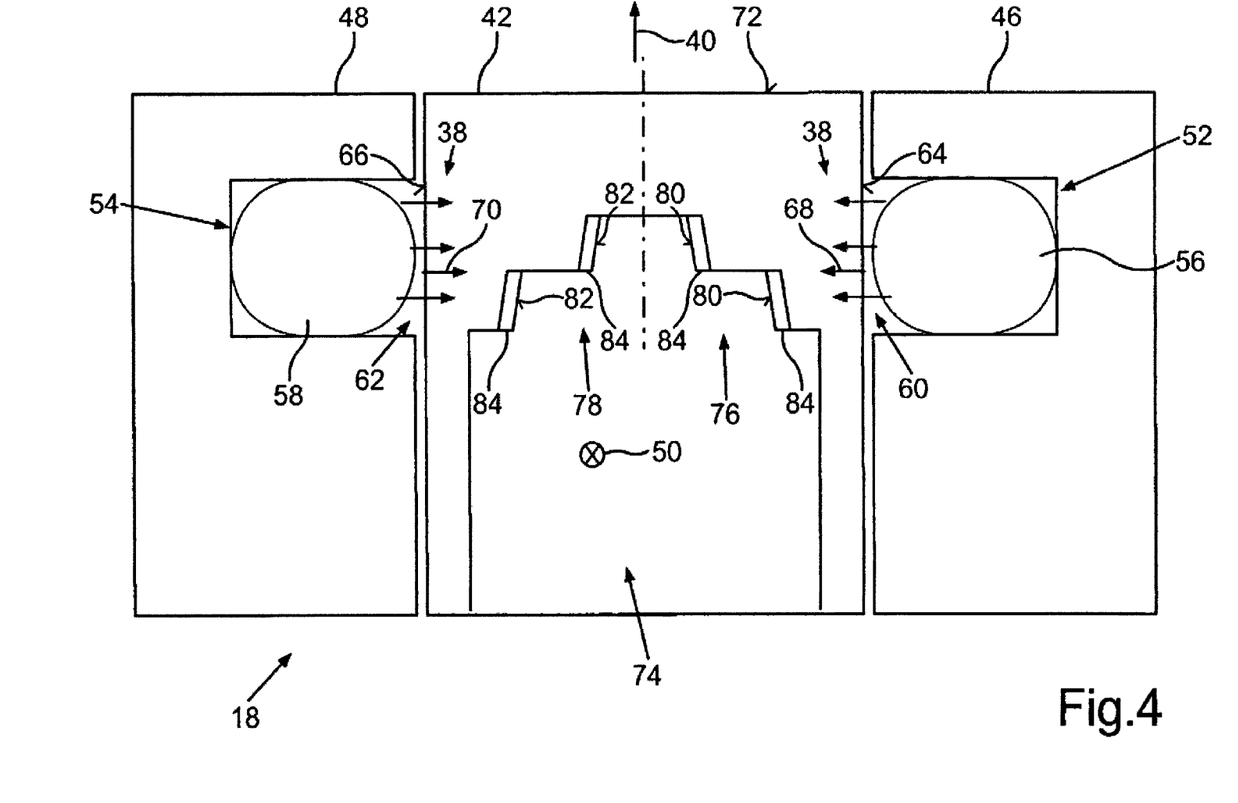
FIG. 4 is a schematic illustration of a cross section through the pointer in FIG. 2.

In the cross section in FIG. 4 it is shown that the propagation regions 52, 54 can be configured, for example, as chambers in which a lightguide fiber 56, 58 (illustrated in FIG. 4 as a vector pointing into the plane of the drawing) can be arranged along the direction 50 of the longitudinal extent. The light which has penetrated the propagation regions 52, 54 at the pointer foot 32 propagates in the lightguide fibers 56, 58 along the direction 50 of longitudinal extent and in doing so exits through passage openings 60, 62 in the propagation regions 52, 54 toward the lightguide 42. The lightguide 42 has in each of the regions of the passage openings 60, 62 a light-entry side 64, 66 through which the light 38 which enters the lightguide 42 along the respective propagation direction 68, 70.

The lightguide 42 has, on a scattering side 74 lying opposite the light-exit side 72, two stepped cascade-shaped regions 76, 78 within the pointer needle 18. The stepped regions 76, 78 can be embodied in such a way that they become visible to the respective viewer by using a structure 84 which is located on edges or steps 80, 82 as soon as the steps 80 82 are irradiated by using the light 38. The effect which occurs here generates a three-dimensional image for the viewer and gives rise to a depth effect within the pointer needle 18. The depth effect is generated here, on the one hand, by the structuring 84 and, on the other hand, by a slightly oblique positioning of the end regions of the cascades 76, 78, that is to say the steps 80, 82. The steps 80, 82 are offset one next to the other transversely with respect to the propagation direction 68, 70 of the light 38 which is irradiating them, that is to say offset one over the other in FIG. 4. The steps 80, 82 are also arranged one behind the other along the respective propagation direction 68, 70, that is to say laterally with respect to one another in FIG. 4. The steps 80, 82 each form a staircase which leads in the propagation direction 40.

Figure 5:
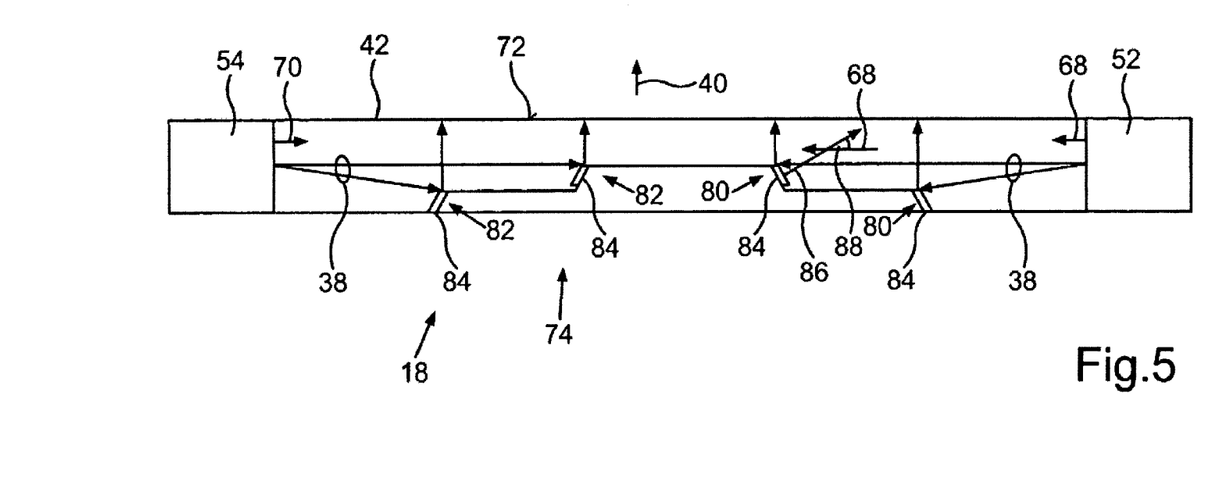
FIG. 5 is a schematic illustration of a further cross section of the pointer from FIG. 2.

The oblique positioning is explained once more in relation to FIG. 5. FIG. 5 shows the normal vector 86 of the plane of the step for a step 80. The step vector 86 intersects with the associated propagation direction 68 at an angle 88 which is greater than 0°.

The illumination by using the lightguide fibers 56, 58 or generally the propagation regions 52, 54 which are located laterally on the lightguide 42, the light 38 is distributed in the direction 50 of the longitudinal extent along the lightguide 42 and can therefore penetrate the lightguide 42 and illuminate it homogenously with light. In order to cover the lightguide fibers 56, 58, they are covered by the light-tight pointer sheath 44. Here it is possible even to dispense with a pointer cap 20 or to integrate the pointer cap 20 into the component of the pointer sheath 44.

Figure 6:
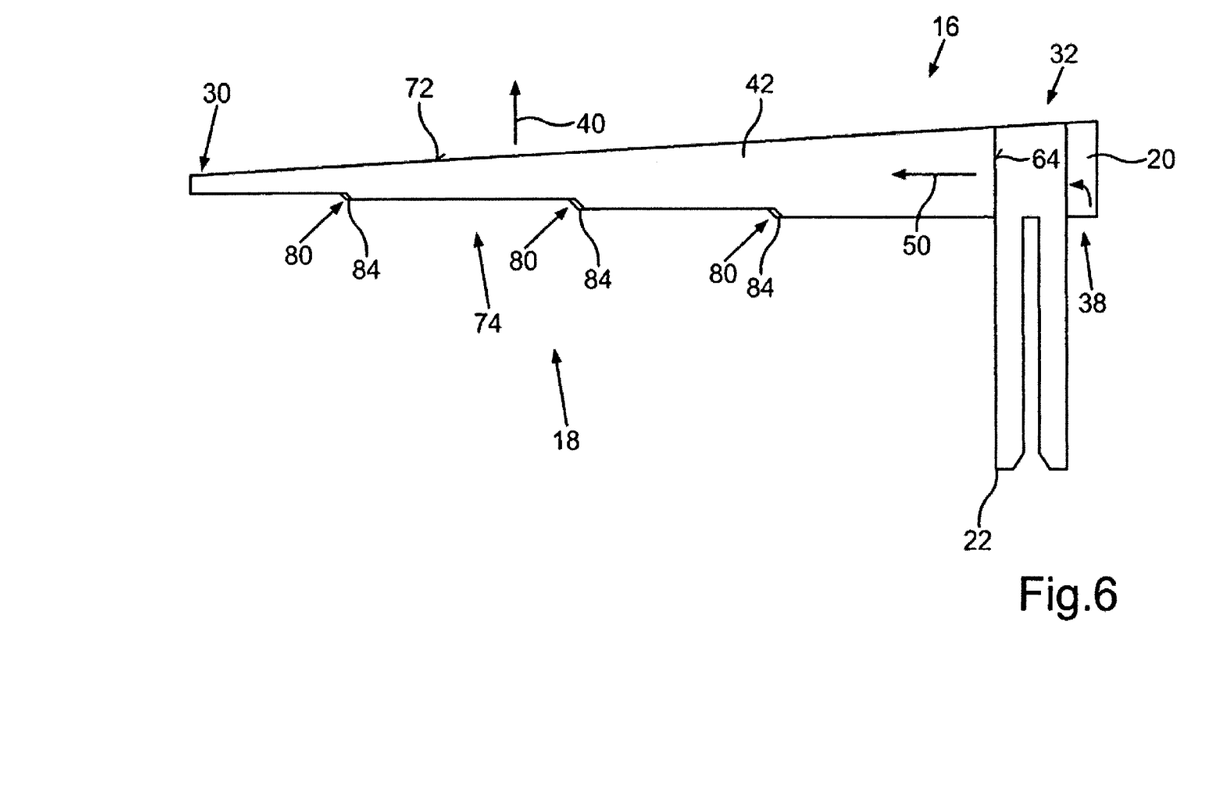
FIG. 6 is a schematic illustration of a longitudinal section of a pointer of an alternative embodiment to the display device as described herein.

In FIG. 6, the longitudinally directed illumination is illustrated. In FIG. 6, the same reference signs are used for functionally identical elements as in the preceding figures. FIG. 6 shows that the light entry face 64 is arranged on the pointer foot 32 of the pointer needle 18 and the light 38 passes, for example via a pointer cap 20 which in this case constitutes a lightguide device, toward the light entry face 64 and penetrates the material of the pointer needle along the direction 50 of longitudinal extent of the pointer needle 18. At steps 80 82 which can also have the described structure 84, the light can be refracted at the scattering side 74 of the pointer needle 18 in the direction of the emission direction 40, with the result that the light 38 exits the lightguide 42 at the light-exit side 72 in the direction of the viewer. In the case of the pointer illustrated in FIG. 6, there is no need for a pointer enclosure (sheath) 44 for distributing the light. The inputting of light is carried out underneath the pointer cap.

According to one or more embodiments described herein there is provided a 3-dimensional display of pointer instruments in the combination instrument by using gradation or cascades and structuring within the pointer needle.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:
1. A display device for a motor vehicle, comprising:
a pointer needle, including:
a pointer foot disposed at one end of the pointer needle, a pointer tip disposed at another end of the pointer needle such that the pointer needle extends in a longitudinal direction from the pointer foot to the pointer tip,
a light input device having a light-tight mount element that surrounds a transparent propagation region provided in the light input device, and
a transparent lightguide having:
a light-entry side, disposed adjacent to the light-tight mount element and extending along the longitudinal direction from the pointer foot to the pointer tip, configured to receive, from the transparent propagation region which is open toward the light-entry side, light propagating along a propagation direction,
a light-exit side configured to emit the light in an emission direction, and
a scattering side disposed opposite to the light-exit side and including a plurality of steps arranged offset in relation to one another and transversely with respect to the propagation direction, the plurality of steps being configured to scatter light entering the transparent lightguide toward the light-exit side.

2. The display device as claimed in claim 1, wherein the plurality of steps are arranged one behind the other along the propagation direction to form a cascade.

3. The display device as claimed in claim 1, wherein the plurality of steps have at least one of a rough surface structure, scattering bodies integrated into a material of the transparent lightguide, a reflective surface coating, and a fluorescent material.

4. The display device as claimed in claim 1, wherein a respective surface normal vector of the plurality of steps intersects with a vector of the propagation direction at an angle in a range from 5° to 85°.

5. The display device as claimed in claim 4, wherein the range of the angle is from 5° to 45°.

6. The display device as claimed in claim 1, wherein the light-tight mount element includes a lightguide fiber arranged in the propagation region and/or a wall having at least one of a reflective surface, a light-scattering surface and a fluorescent material.

7. The display device as claimed in claim 1, wherein
the pointer needle includes another light input device, and
the transparent lightguide includes:
another light-entry side lying opposite the light-entry side, the other light-entry side being configured to receive, from the other light input device, light propagating along another propagation direction, and
the scattering side includes another plurality of steps arranged in a mirror-symmetrical fashion with respect to the plurality of steps.

8. The display device as claimed claim 1, further comprising:
a pointer shaft configured to support the pointer needle at one end; and
a light source disposed adjacent to the pointer shaft and configured to emit light along the pointer shaft,
wherein the pointer needle is arranged so as to be rotatable with respect to a direction of light emitting from the light source.

9. A motor vehicle, comprising:
a chassis; and
a display device having a pointer needle, the pointer needle including:

a pointer foot disposed at one end of the pointer needle,
a pointer tip disposed at another end of the pointer needle such that the pointer needle extends in a longitudinal direction from the pointer foot to the pointer tip,
a light input device having a light-tight mount element that surrounds a transparent propagation region provided in the light input device, and
a transparent lightguide having:
a light-entry side, disposed adjacent to the light-tight mount element and extending along the longitudinal direction from the pointer foot to the pointer tip, configured to receive, from the transparent propagation region which is open toward the light-entry side, light propagating along a propagation direction,
a light-exit side configured to emit the light in an emission direction, and
a scattering side disposed opposite to the light-exit side and including a plurality of steps arranged offset in relation to one another and transversely with respect to the propagation direction, the plurality of steps being configured to scatter light entering the transparent lightguide toward the light-exit side.

10. The display device as claimed in claim 9, wherein
the light-tight mount element includes at least one of a lightguide fiber and a reflective coating configured to direct light from the transparent propagation region which is open toward the light-entry side in the propagation direction, toward the light-entry side.

11. The display device as claimed in claim 9, wherein
the plurality of steps include a first step spaced apart from the light-entry side by a first distance in the propagation direction, and a second step spaced apart from the light-entry side by a second distance in the propagation direction, the second distance being greater than the first distance, and
the second step is disposed closer to the light-exit side than the first step in the emission direction.

12. The display device as claimed in claim 9, further comprising:
a printed circuit board;
a light source disposed on the printed circuit board and configured to emit light toward the light input device; and
a pointer shaft configured to support the pointer needle at one end such that the pointer needle is rotatable about the pointer shaft,
wherein the plurality of steps include a first step spaced apart from the printed circuit board by a first distance in the emission direction, and a second step spaced apart from the printed circuit board by a second distance in the emission direction, the second distance being greater than the first distance.

13. The display device as claimed in claim 9, wherein
the light-tight mount element includes:
a first light-tight mount element having a first transparent propagation region with a first opening extending in the longitudinal direction from which light exits in a first propagation direction transverse to the longitudinal direction, and
a second light-tight mount element having a second transparent propagation region with a second opening extending in the longitudinal direction from which light exits in a second propagation direction transverse to the longitudinal direction and opposite of the first propagation direction, and the light-entry side includes:
   a first light-entry side facing the first light-tight mount element and configured to receive light exiting from the first opening, and
   a second light-entry side facing the second light-tight mount element and configured to receive light exiting from the second opening, and the plurality of steps include:
   a first set of steps arranged offset in relation to one another in the first direction and configured to scatter light received at the first light-entry side toward the light-exit side, and
   a second set of steps arranged offset in relation to one another in the second direction and configured to scatter light received at the second light-entry side toward the light-exit side.

14. The display device as claimed in claim 13, wherein the first set of steps include a first step spaced apart from the first light-entry side by a first distance in the propagation direction, and a second step spaced apart from the first light-entry side by a second distance in the propagation direction, the second distance being greater than the first distance, and the second step is disposed closer to the light-exit side than the first step in the emission direction.

15. The display device as claimed in claim 14, wherein the first step has a first side facing the first light-entry side that scatters the light received at the first light-entry side toward the light-exit side, and the first side is disposed at an angle in a range from 5° to 85° with respect to the first direction.

* * * * *

UNITED STATES PATENT AND TRADEMARK OFFICE
CERTIFICATE OF CORRECTION

| | | |
|---|---|---|
| PATENT NO. | : 9,837,172 B2 | Page 1 of 1 |
| APPLICATION NO. | : 15/325340 | |
| DATED | : December 5, 2017 | |
| INVENTOR(S) | : Matthias Wunderlich et al. | |

It is certified that error appears in the above-identified patent and that said Letters Patent is hereby corrected as shown below:

In the Claims

Column 7, Line 55:
In Claim 8, after "claimed" insert -- in --.

Signed and Sealed this
Nineteenth Day of June, 2018

Andrei Iancu
*Director of the United States Patent and Trademark Office*